(12) United States Patent
Masoudnia

(10) Patent No.: US 9,863,657 B2
(45) Date of Patent: Jan. 9, 2018

(54) THERMO ELECTRIC REGISTER SYSTEM

(71) Applicant: Shahram Masoudnia, Gladwyne, PA (US)

(72) Inventor: Shahram Masoudnia, Gladwyne, PA (US)

( * ) Notice: Subject to any disclaimer, the term of this patent is extended or adjusted under 35 U.S.C. 154(b) by 172 days.

(21) Appl. No.: 14/579,798

(22) Filed: Dec. 22, 2014

(65) Prior Publication Data

US 2015/0377502 A1 Dec. 31, 2015

Related U.S. Application Data

(60) Provisional application No. 61/919,328, filed on Dec. 20, 2013.

(51) Int. Cl.
| | |
|---|---|
| *F24F 3/16* | (2006.01) |
| *F24F 11/00* | (2006.01) |
| *G05D 23/19* | (2006.01) |

(52) U.S. Cl.
CPC .......... *F24F 11/0012* (2013.01); *F24F 3/166* (2013.01); *G05D 23/1934* (2013.01); *F24F 2003/1667* (2013.01); *F24F 2011/0056* (2013.01)

(58) Field of Classification Search
CPC ... F24F 11/503; F24F 3/166; F24F 2003/1667
See application file for complete search history.

(56) References Cited

U.S. PATENT DOCUMENTS

| | | | | |
|---|---|---|---|---|
| D453,564 S | * | 2/2002 | Schrank | D23/393 |
| 2003/0157883 A1 | * | 8/2003 | Kwak | F24F 11/053 454/258 |
| 2004/0213714 A1 | * | 10/2004 | Zhang | A61L 2/08 422/300 |
| 2005/0266792 A1 | * | 12/2005 | Rimmer | F24F 11/053 454/290 |
| 2006/0286918 A1 | * | 12/2006 | Vargas | B60H 1/00871 454/155 |
| 2007/0298706 A1 | * | 12/2007 | Hudon | F24F 11/04 454/256 |
| 2008/0041969 A1 | * | 2/2008 | Nathan | F24F 11/053 236/49.3 |
| 2009/0149123 A1 | * | 6/2009 | Blagg | F24F 11/053 454/258 |

(Continued)

FOREIGN PATENT DOCUMENTS

GB 2141818 A * 1/1985 ............... A62C 2/24

*Primary Examiner* — Daniel J Colilla

(57) ABSTRACT

The invention is a thermostatically controlled vent installed in the existing outflow ventilation ducts of a heating, ventilation, air conditioning system. When the central heating/cooling unit is operating, temperature variation is achieved by an electronic control which opens and closes air flow fins on the vent based on the settings of an individual thermostat for each room in a building that has the device installed. The individual thermostat of each vent in the system is connected to the primary building thermostat and therefore has the ability to signal the need to turn on/off the heating/cooling unit as appropriate. In addition, the invention can purify the air flow by means of an ultraviolet sterilization lamp. It is possible to remotely set the temperature settings via an internet enabled software app.

4 Claims, 21 Drawing Sheets

(56) References Cited

U.S. PATENT DOCUMENTS

2011/0031322 A1\* 2/2011 Zou ...................... F24F 3/0442
236/1 B
2014/0295750 A1\* 10/2014 Anderson ............... F16K 1/165
454/256

\* cited by examiner

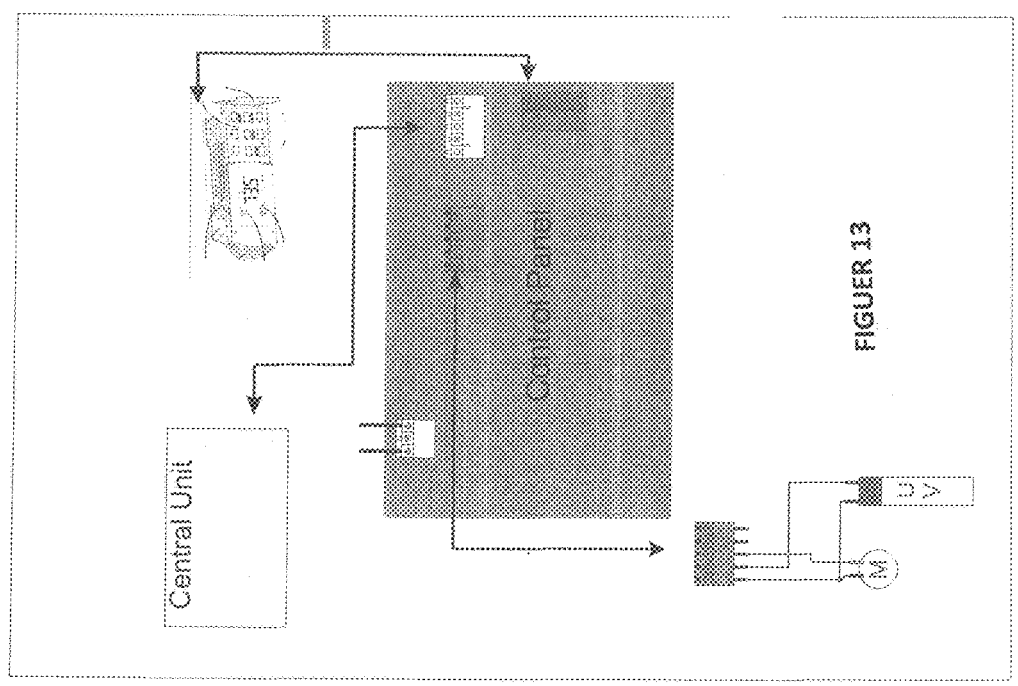

THERMO ELECTRIC REGISTER SYSTEM

FIELD OF THE INVENTION

The present invention relates generally to heating, ventilation, and air conditioning systems, or HVAC for short. More specifically, the present invention is a thermo electric register system which is intended to allow a central HVAC system to be adapted to heat or cool rooms to different temperatures. In most central HVAC systems, the entire building or house is restricted to only one temperature which is controlled by a single thermostat. The present invention solves this issue, and allows for independent control of the temperature in different rooms of the building or house; the present invention is intended as a retrofit, making it possible for central HVAC systems to heat and cool different rooms connected to the system to varying temperatures.

BACKGROUND OF THE INVENTION

It is an object of the present invention to introduce a thermo electric register system which can be installed into a preexisting HVAC system. It is an object of the present invention to adapt a preexisting central HVAC system to allow the system to alter the temperature of rooms in a building independently of one another. It is a further object of the present invention to include an individual thermostat for each room in the building such that the user can set their desired temperature while they are occupying the room. It is a further object of the present invention to accomplish variation of the temperature in rooms by varying the flow of air out of the HVAC system and into the room through the use of an automated vent installed on the outflow of the ventilation ducts. Finally, it is the object of the present invention to purify the air flow by means of an ultraviolet sterilization lamp.

BRIEF DESCRIPTION OF THE DRAWINGS

FIG. 13 is a diagram representing the electrical connections between the various components of the modification kit, the wall thermostat, and the central HVAC system.

SUMMARY OF THE INVENTION

All illustrations are for the purpose of describing selected parts of the present invention and are not intended to limit the scope of the present invention.

The present invention is a thermo electric register system which is designed to be installed into a preexisting HVAC system. The present invention is intended to provide the HVAC system into which it is installed the ability to vary the temperature of multiple rooms of a given building independently of one another. For example, one room may be at one temperature while a second room is at a second temperature. The temperature is controlled by limiting the flow of conditioned air into the room. Obviously there are limits to the variation in temperature that can exist as the HVAC system is typically either in heating or cooling mode, not both at once. The present invention comprises a modification kit which includes several components which are necessary to achieve the desired functionality of independent room temperature control. Each room of the building in which independent temperature control is desired requires one modification kit. The components of the modification kit are integrated into the preexisting HVAC architecture of the building. There must be at least one outflow vent for conditioned air within the room that is desired for independent temperature control. Without at least one outflow vent then the temperature of that room cannot be varied independently from the rest of the building. This is typically not an issue as most inhabited rooms of a building will possess at least one air outflow vent in order to achieve optimum temperature levels in that room. Each modification kit comprises a plurality of automated vents, a thermostat, and a power converter.

Figure 1:
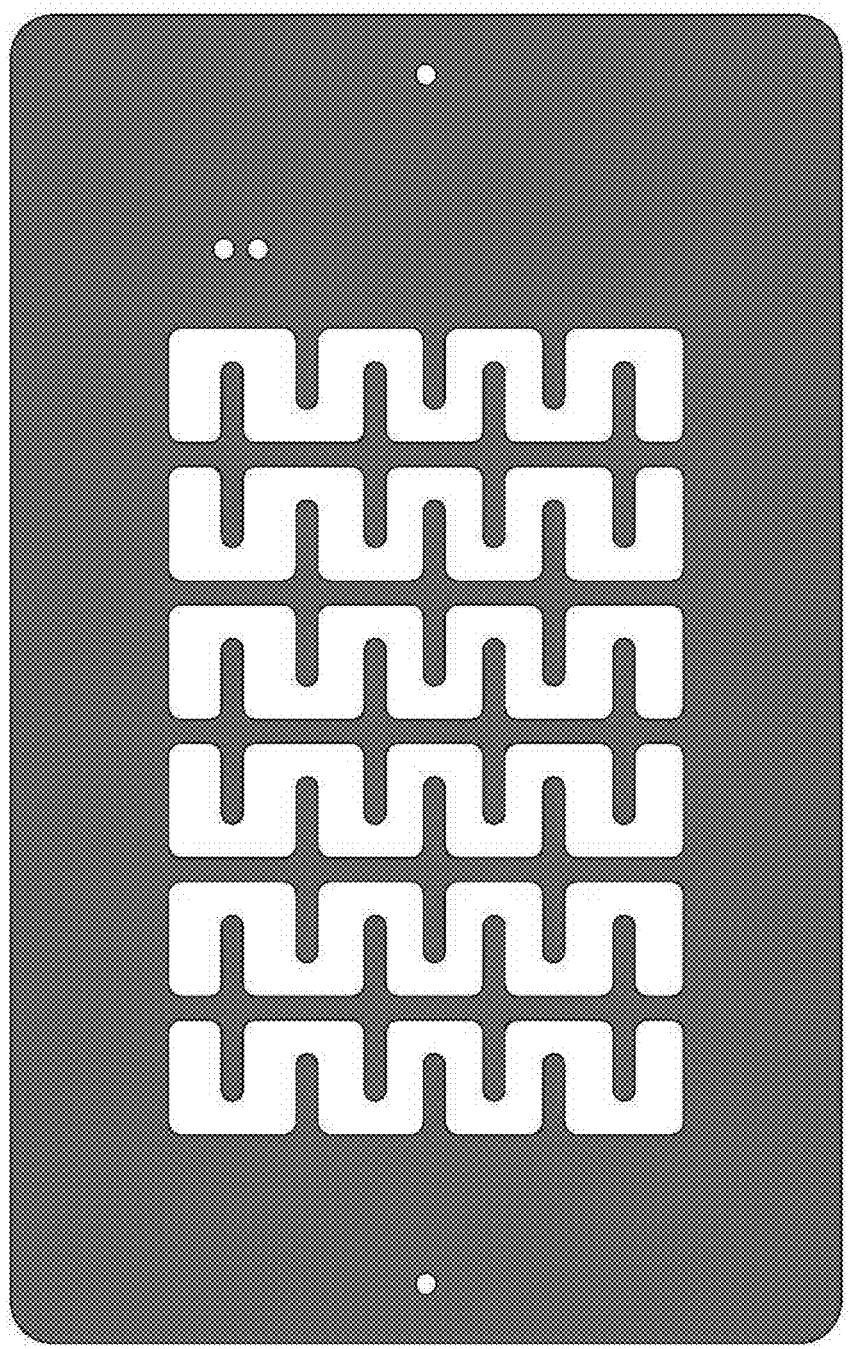
FIG. 1 displays a front perspective view of the faceplate.

The automated vents are responsible for varying the airflow rate into the room. This is the primary modus by which the present invention alters the temperature of the room. For example, if the HVAC system is in a heating cycle, and it is desired for a given room where a modification kit is installed to be cooler than other rooms, the automated vents will restrict airflow into that room. The inverse is true of a situation in which the room is desired to be warmer that the rest of the rooms in the building. This also works for cooling cycles of the HVAC. Each of the automated vents comprise a faceplate, a plurality of airflow regulating fins, a rotation motor, an actuation interface, an ultraviolet sterilization lamp, a control circuit, and light emitting diode indicators. Each of the automated vents is installed over one of the outflow vents of the preexisting HVAC system that exist within a given room. Thus, the exact number of automated vents present in any given room depends largely upon the design of the preexisting HVAC system. The faceplate serves to allow each automated vent to be installed over an outflow of the HVAC system. The faceplate comprises a rectangular shaped plate of material which is perforated by a series of holes to allow airflow through it. The faceplate also comprises a plurality of fastener holes which traverse through it. The plurality of fastener holes allow the faceplate to be fastened to a wall over one of the outflow vents. The faceplate also serves as a base for the other components of the automated vent, with the other components being mounted directly or indirectly to the faceplate. Thus each automated vent is its own finite element which is provided fully assembled to ensure that any user of the present invention is able to swiftly and easily install the automated vent over an outflow with minimal effort. The faceplate can be observed in FIG. 1 of the present invention.

Figure 2A:
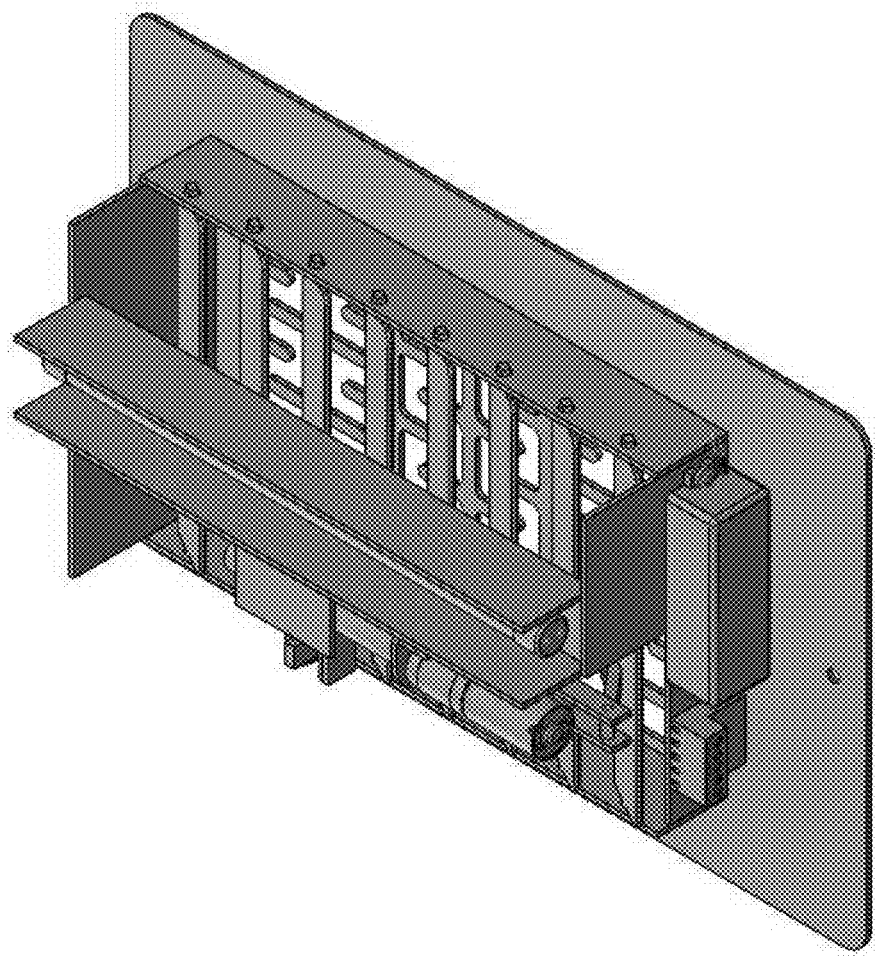
FIG. 2a displays a rear perspective view of one of the automated vents.

The plurality of airflow regulating fins are provided to accomplish the object of regulating the airflow out of the automated vent. The plurality of airflow regulating fins are mounted directly behind the faceplate as can be observed in FIG. 2a and FIG. 2b. Each of the plurality of airflow regulating fins comprises a largely rectangular plate or fin which further compromises a cylindrical pin protruding from both the top and the bottom. The cylindrical pin allows each airflow regulating fin to be mounted behind the faceplate in a way such that it is allowed to rotate. A pair of brackets are mounted on near the top and bottom of the faceplate as can be observed in FIG. 2b and FIG. 3 for this express purpose. Each of the plurality of airflow regulating fins can rotate through some range of angles which causes the area available for air to flow through to fluctuate, effectively regulating airflow out of the automated vent. Although the method described above for mounting the plurality of airflow regulating fins represents the preferred embodiment, it is accepted that other methods could also be utilized for mounting them to the faceplate. The plurality of airflow regulating fins are capable of rotating, however they must be provided with actuation force in order for this to be accomplished. The rotation motor and the actuation interface are present to achieve this.

Figure 2B:
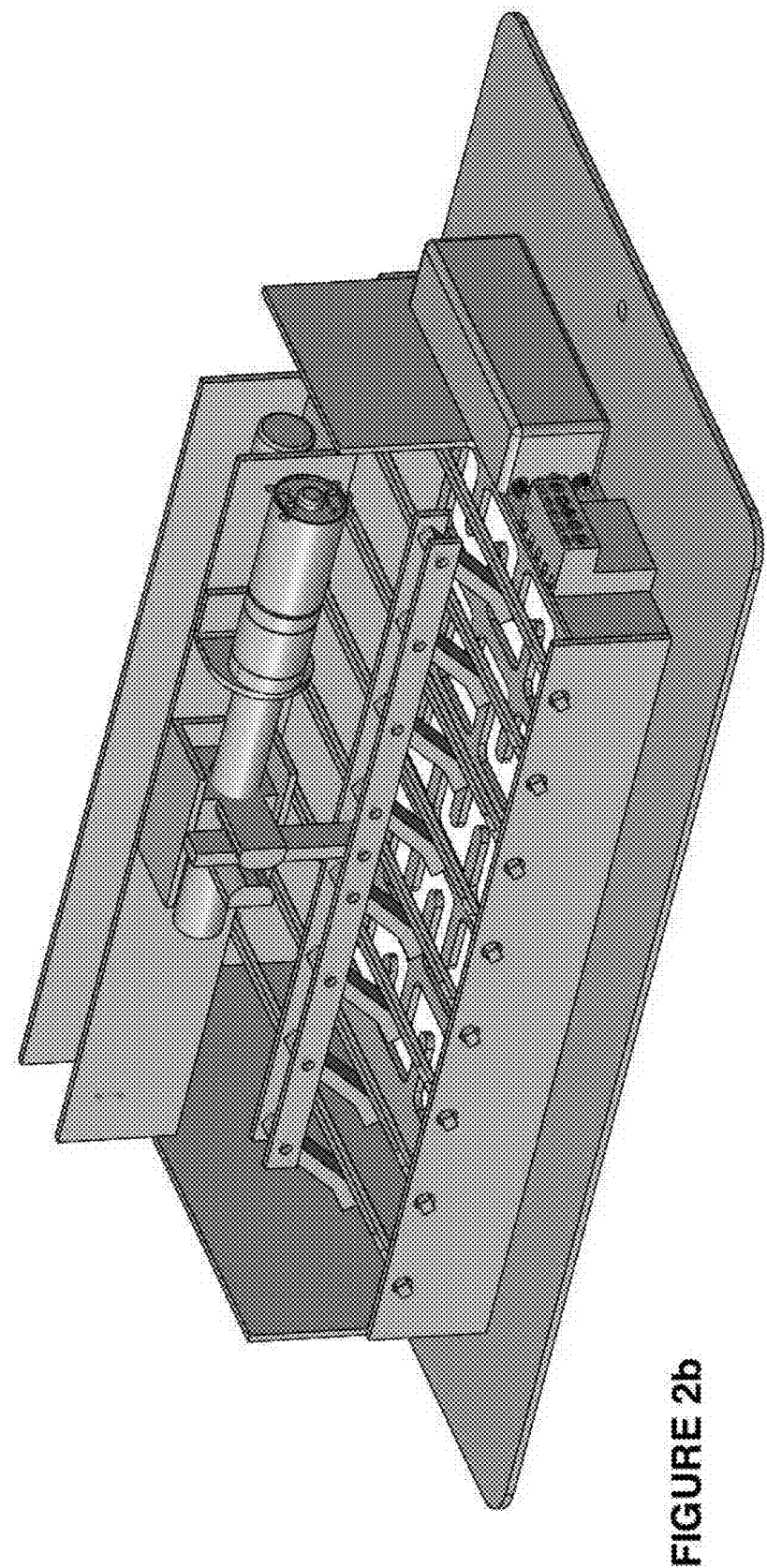
FIG. 2b displays another perspective view of the automated vent.
Figure 3:
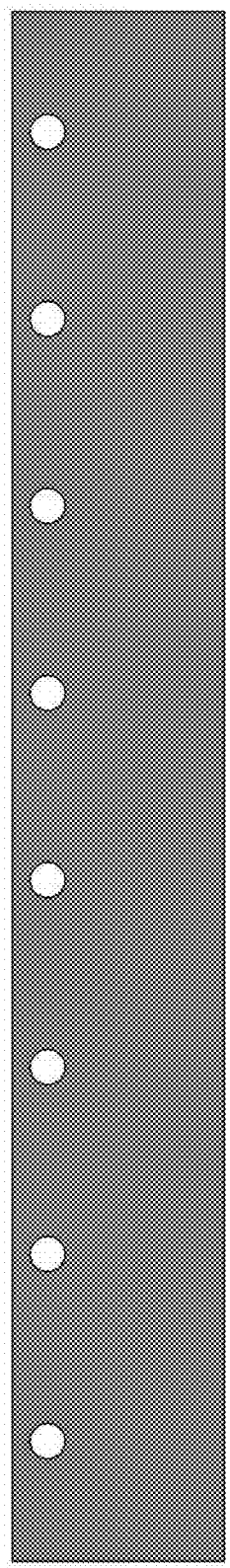
FIG. 3 is a perspective view of the fin housing.
Figure 4:
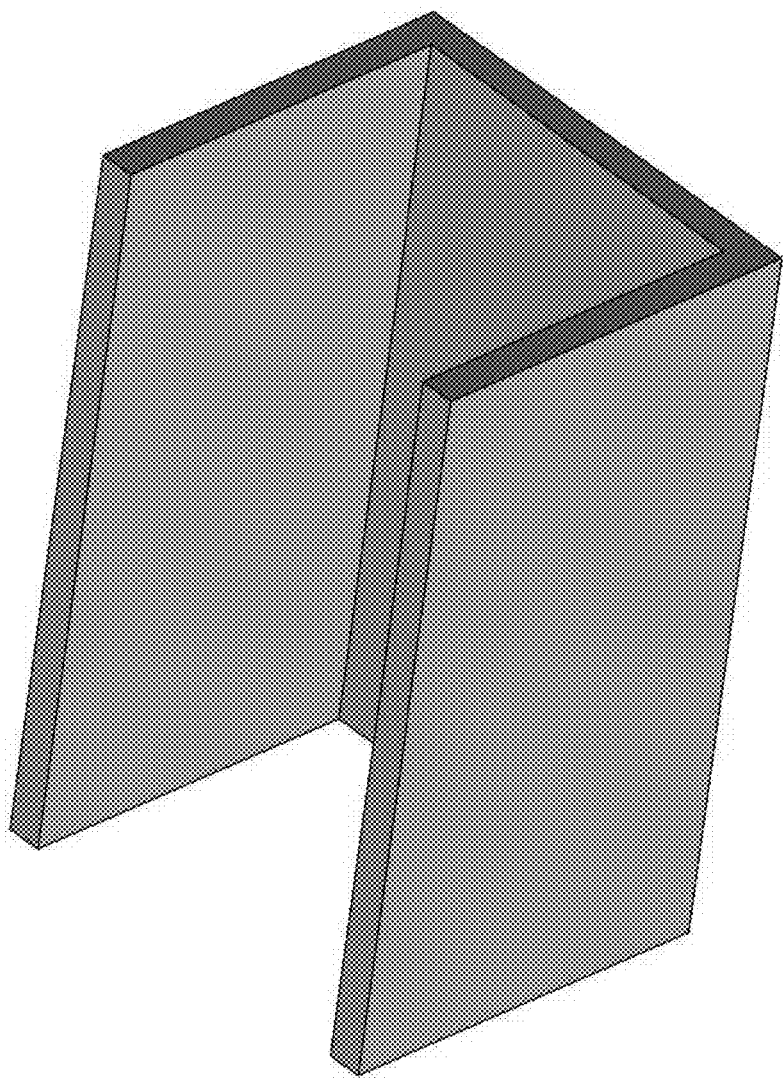
FIG. 4 displays a perspective view of the rotational motor housing.
Figure 5:
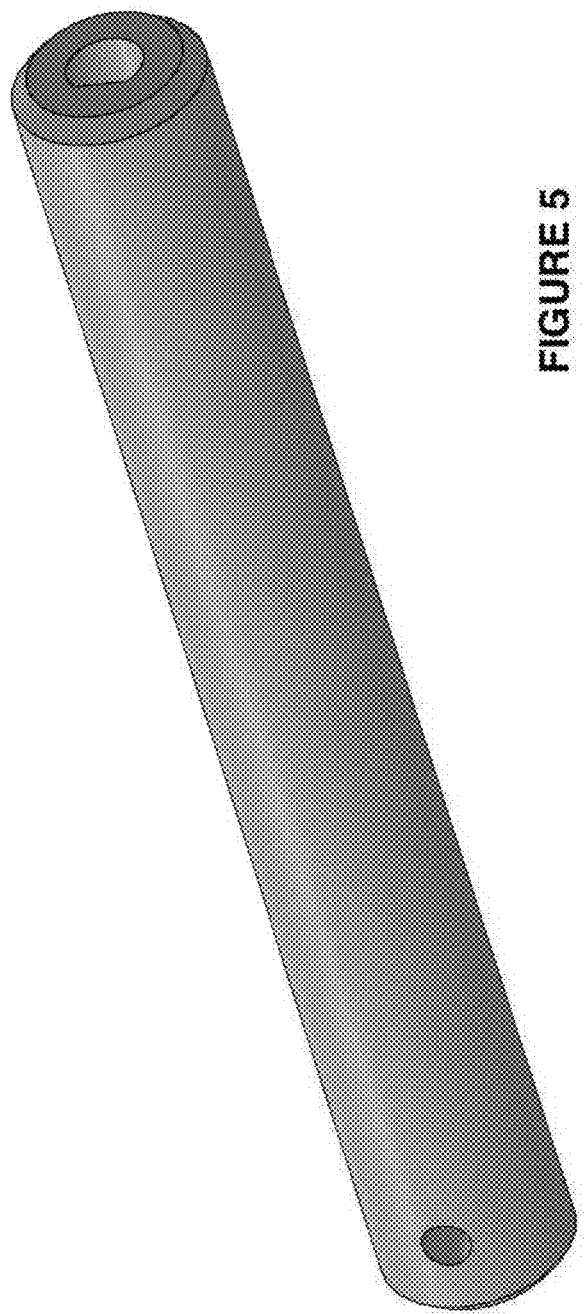
FIG. 5 displays a perspective view of the fin control rotational Motor.
Figure 6:
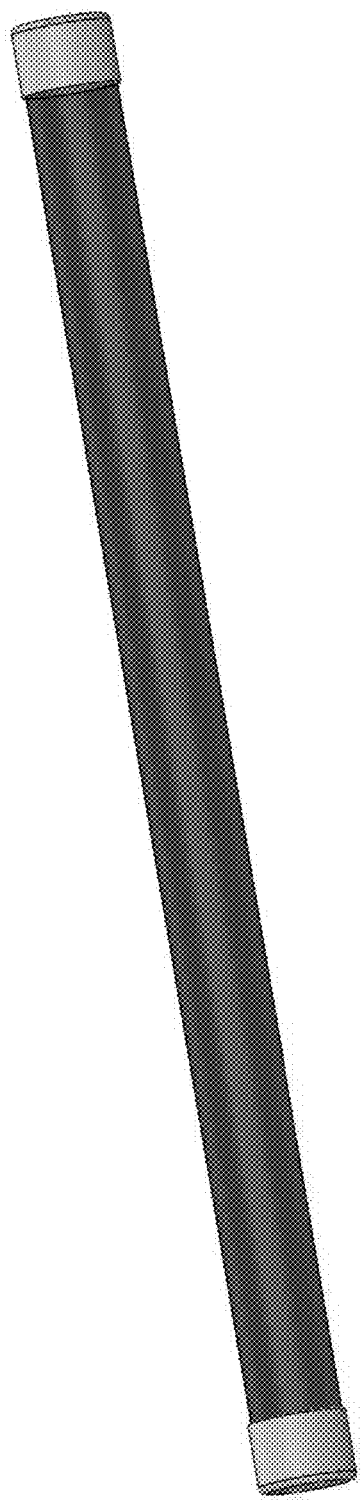
FIG. 6 displays a perspective view of the ultraviolet sterilization lamp.
Figure 7:
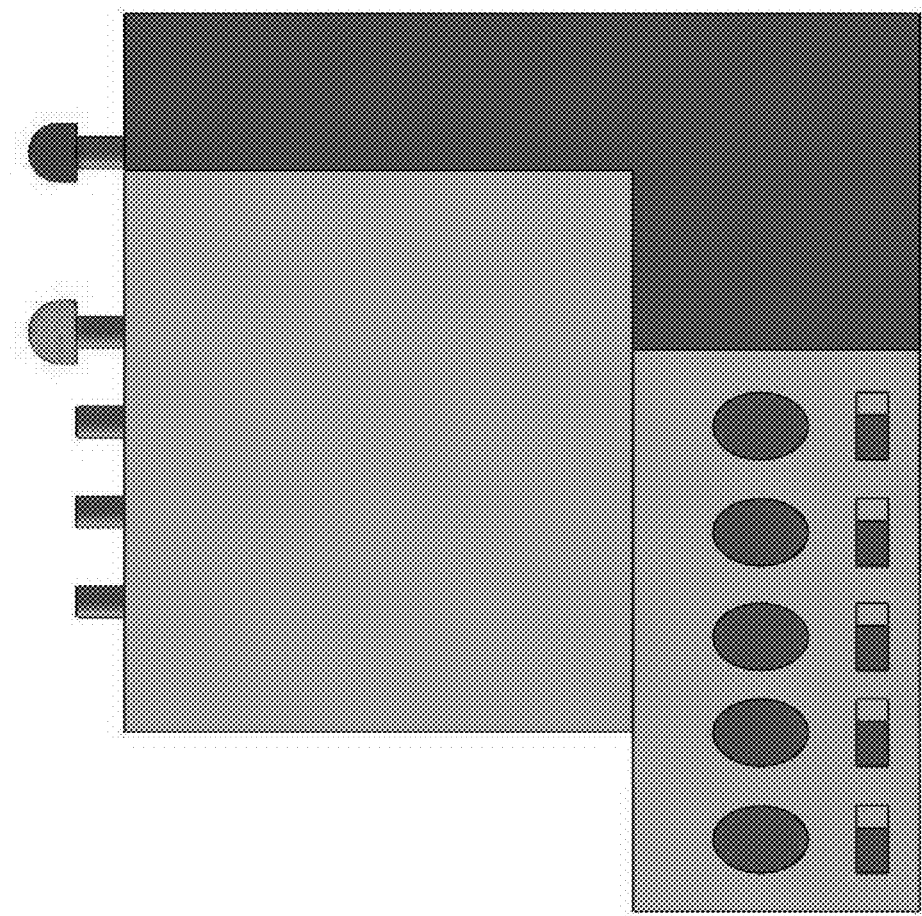
FIG. 7 displays a perspective view of an electrical connection block with two LED indicator lights.
Figure 8:
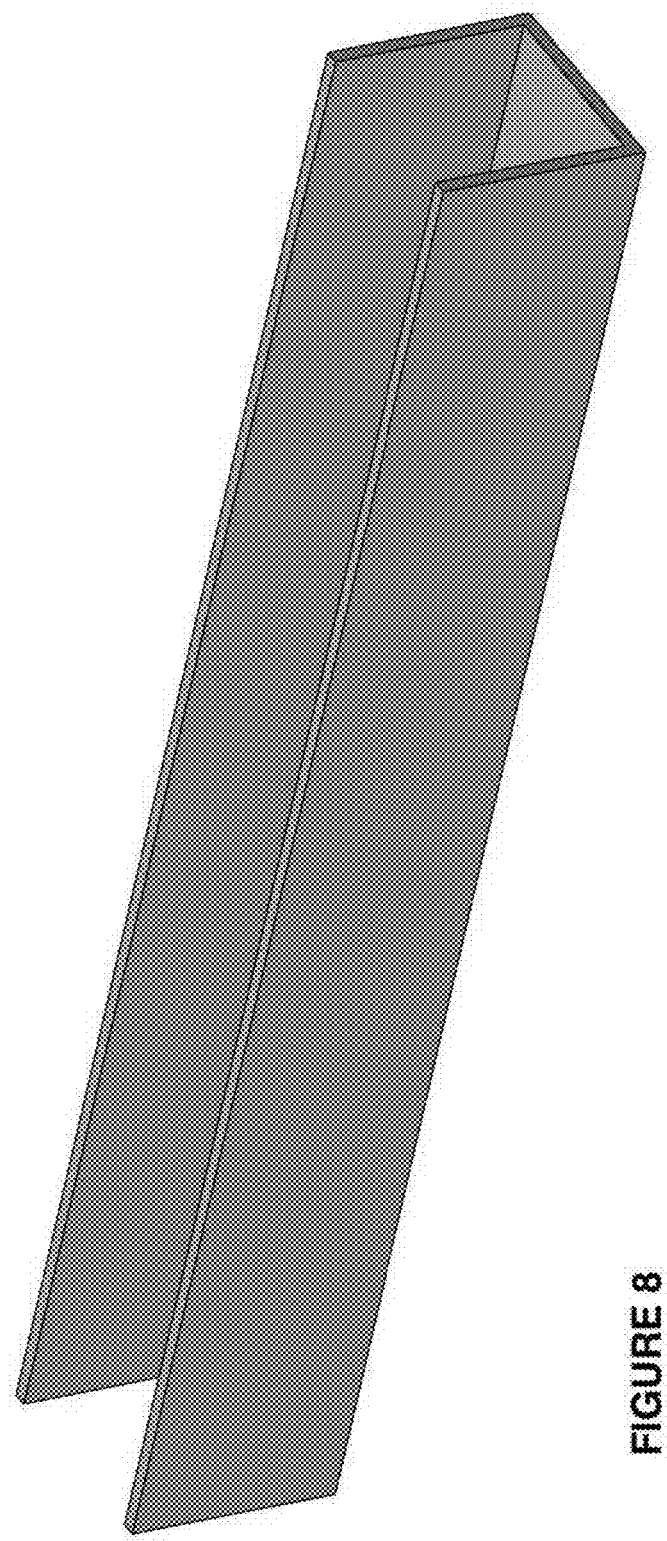
FIG. 8 displays a perspective view of the UV lamp housing.
Figure 9:
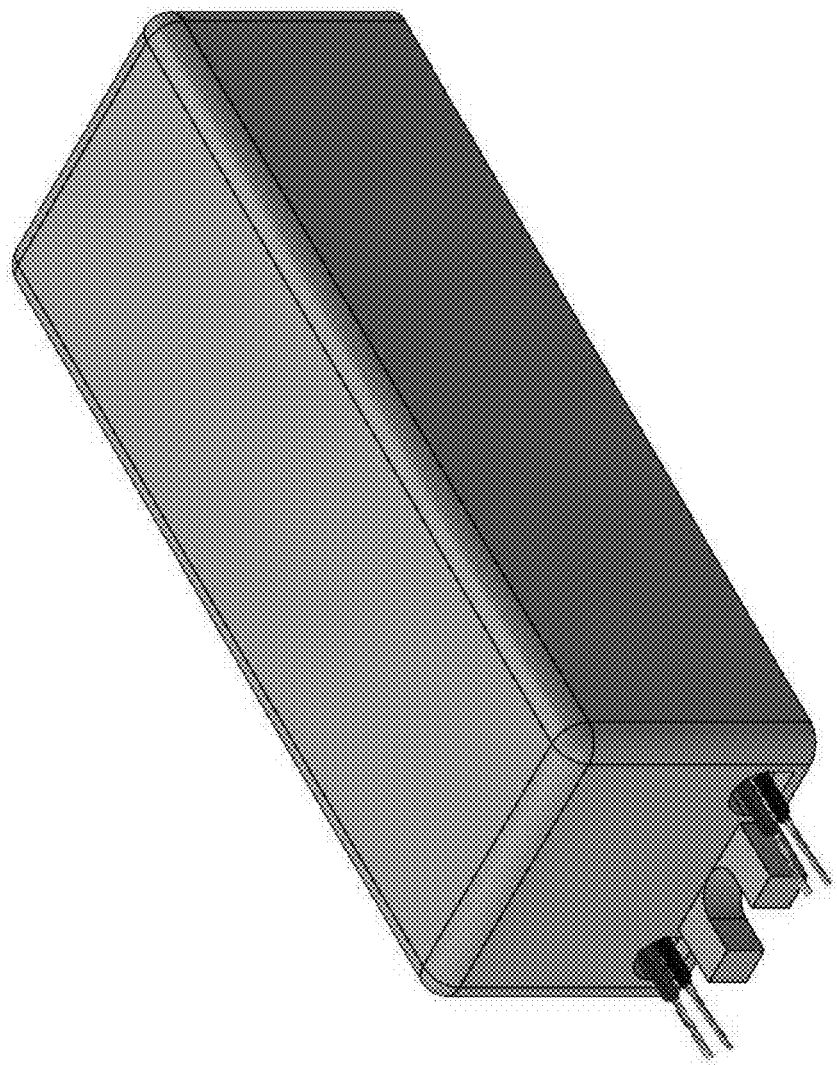
FIG. 9 displays a perspective view of the transformer.
Figure 10A:
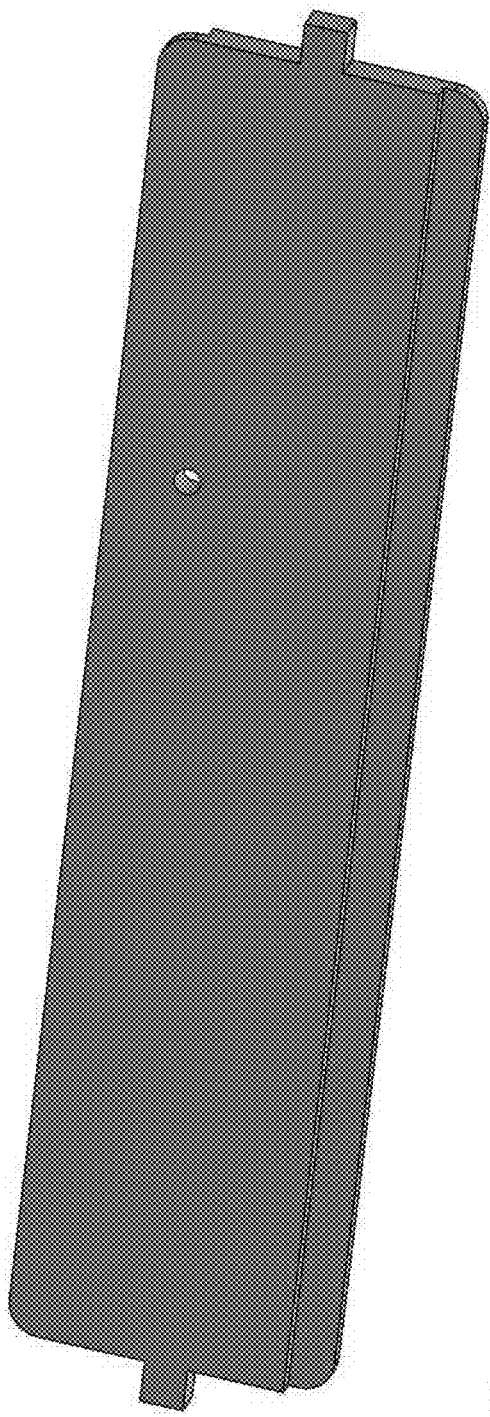
FIG. 10a displays a perspective view of a vent fin component.
Figure 10B:
FIG. 10b displays a perspective view of another fin control component.
Figure 10C:
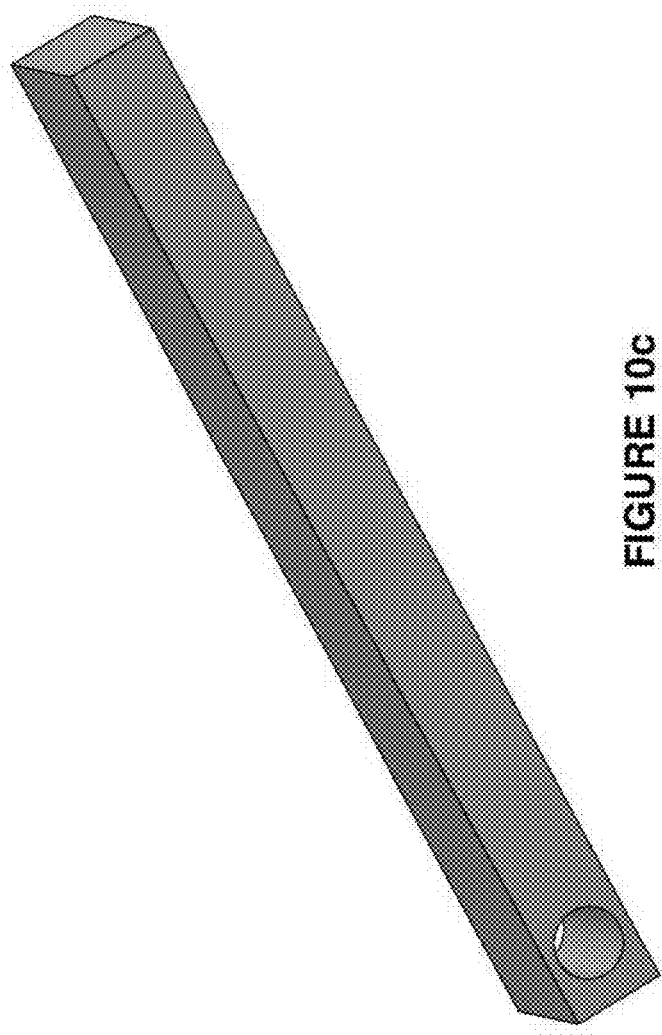
FIG. 10c displays a perspective view of the fin control spring.
Figure 10D:
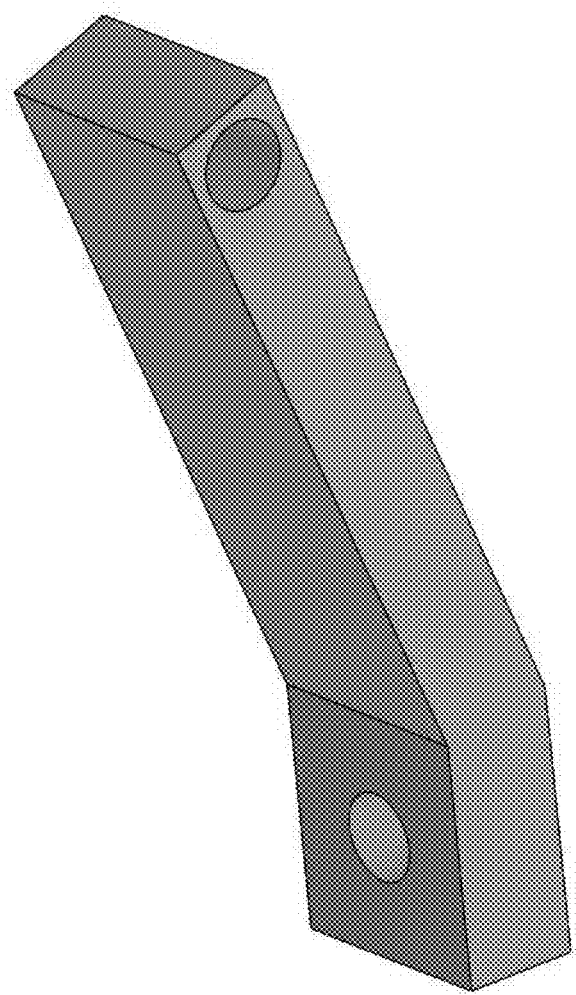
FIG. 10d displays a perspective view of another fin control component.
Figure 10E:
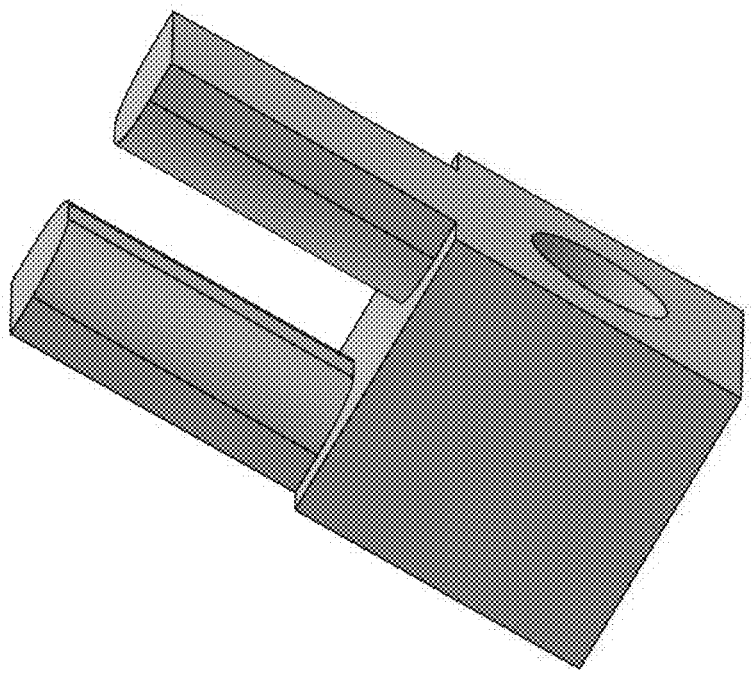
FIG. 10e displays a perspective view of a fin control component.
Figure 11A:
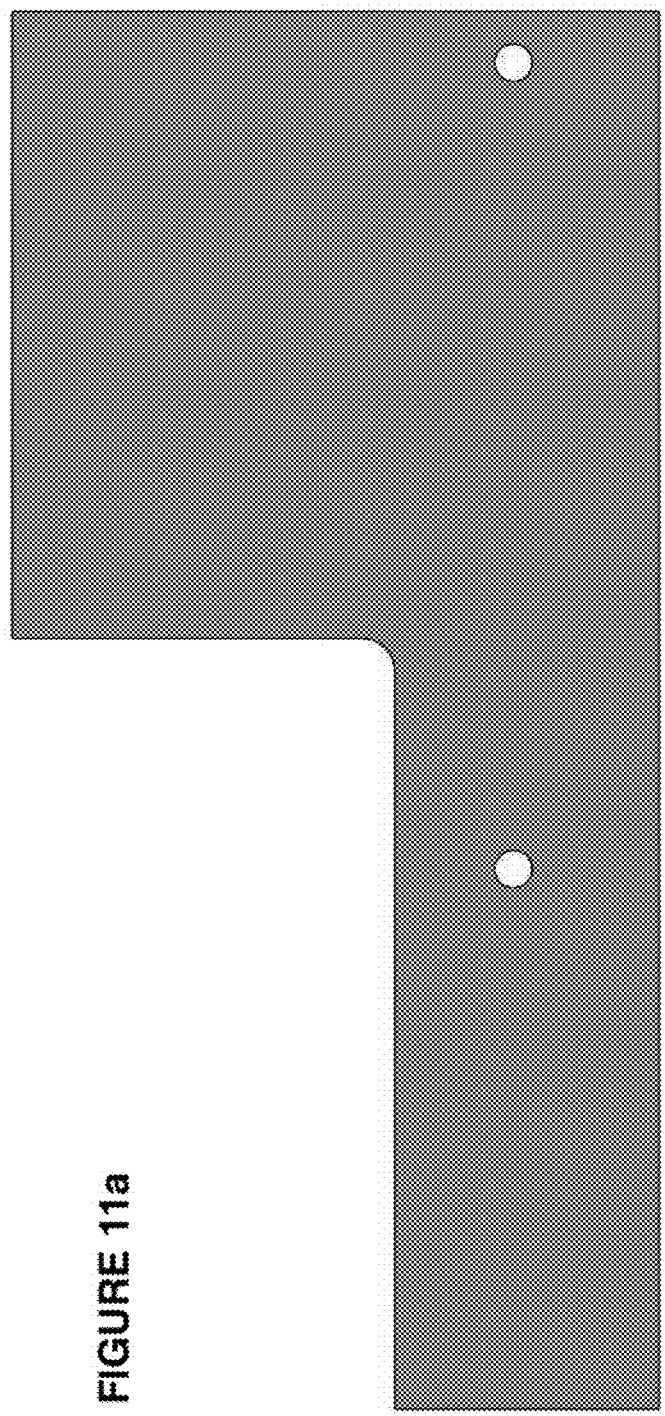
FIG. 11a displays a perspective view of the fin housing side (right).
Figure 11B:
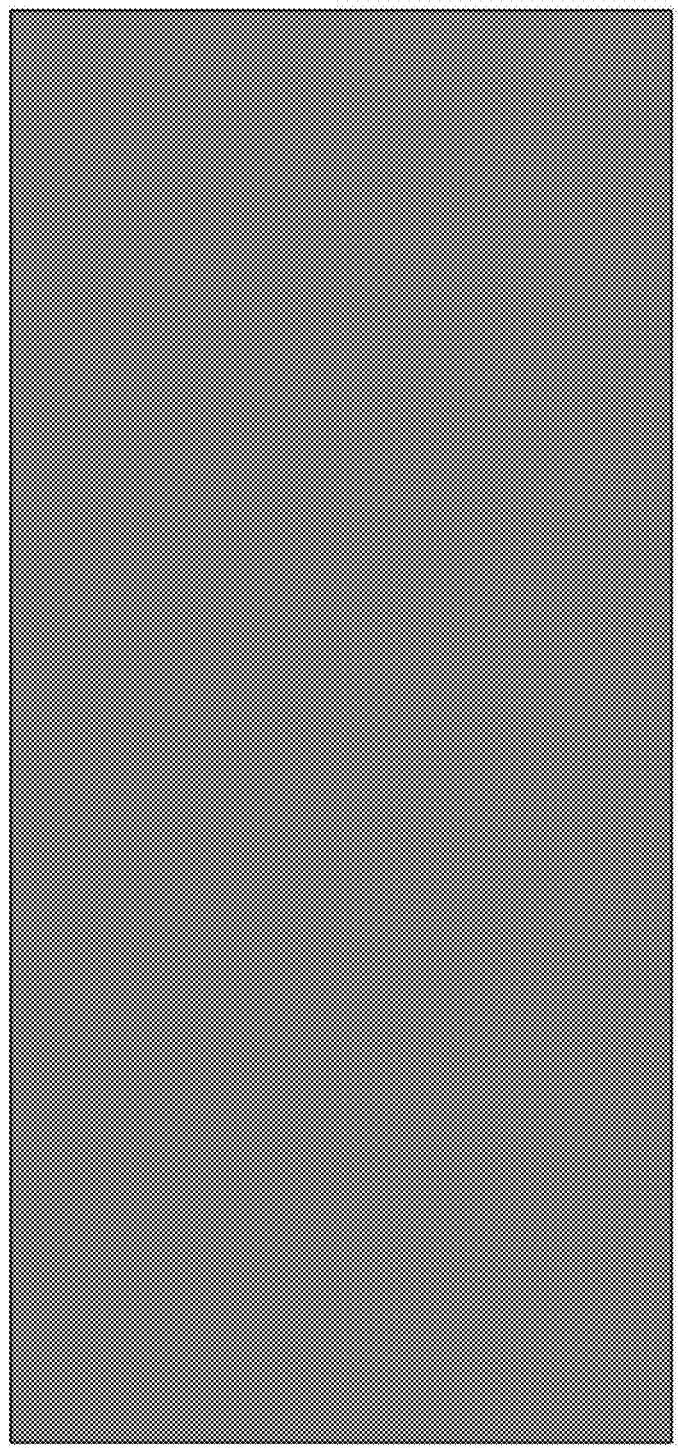
FIG. 11b displays a perspective view of the fin housing side (left).
Figure 12A:
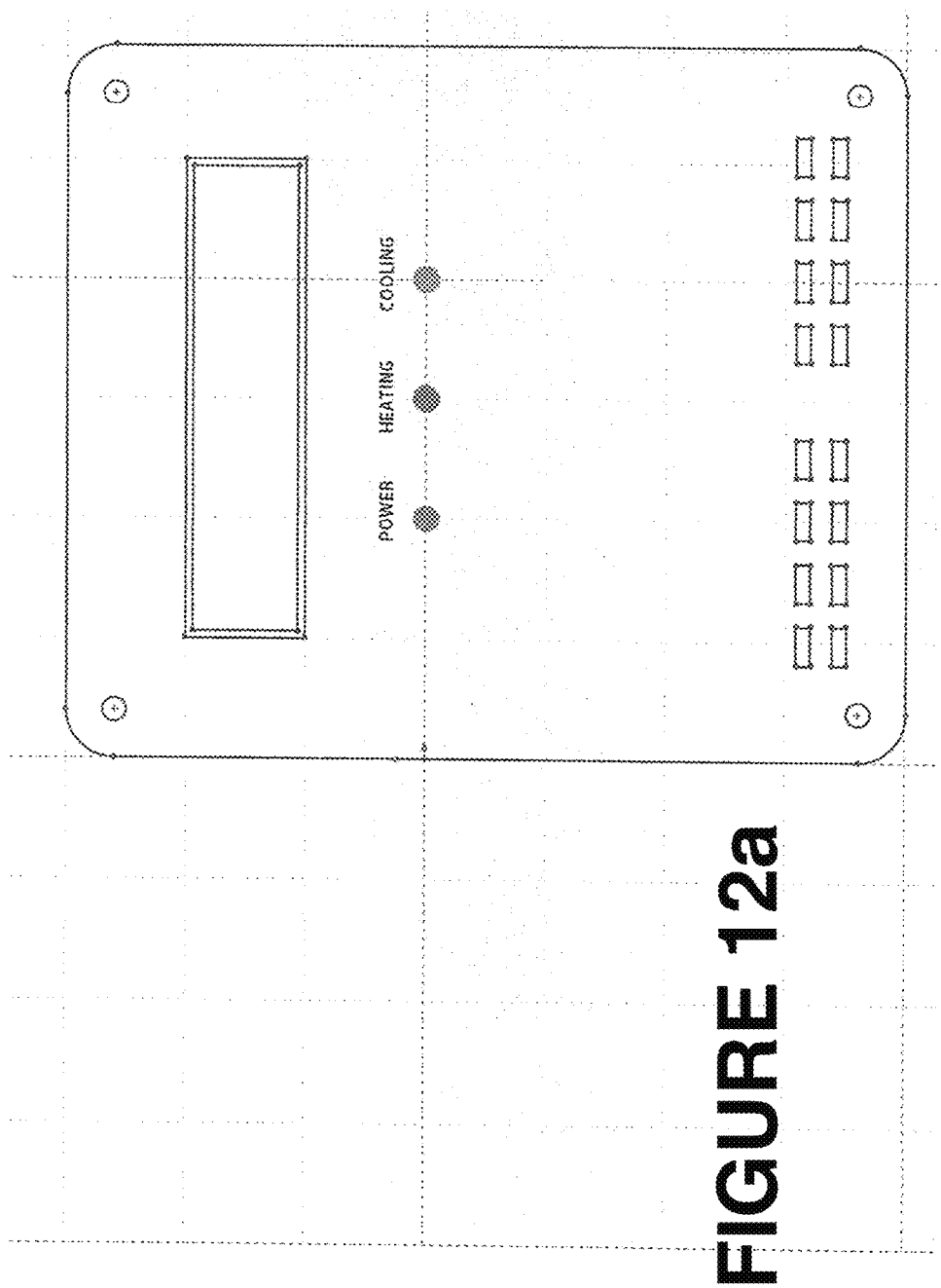
FIG. 12a displays a perspective view of the central control unit faceplate (vertical alignment) showing an error message window and three status lights.
Figure 12B:
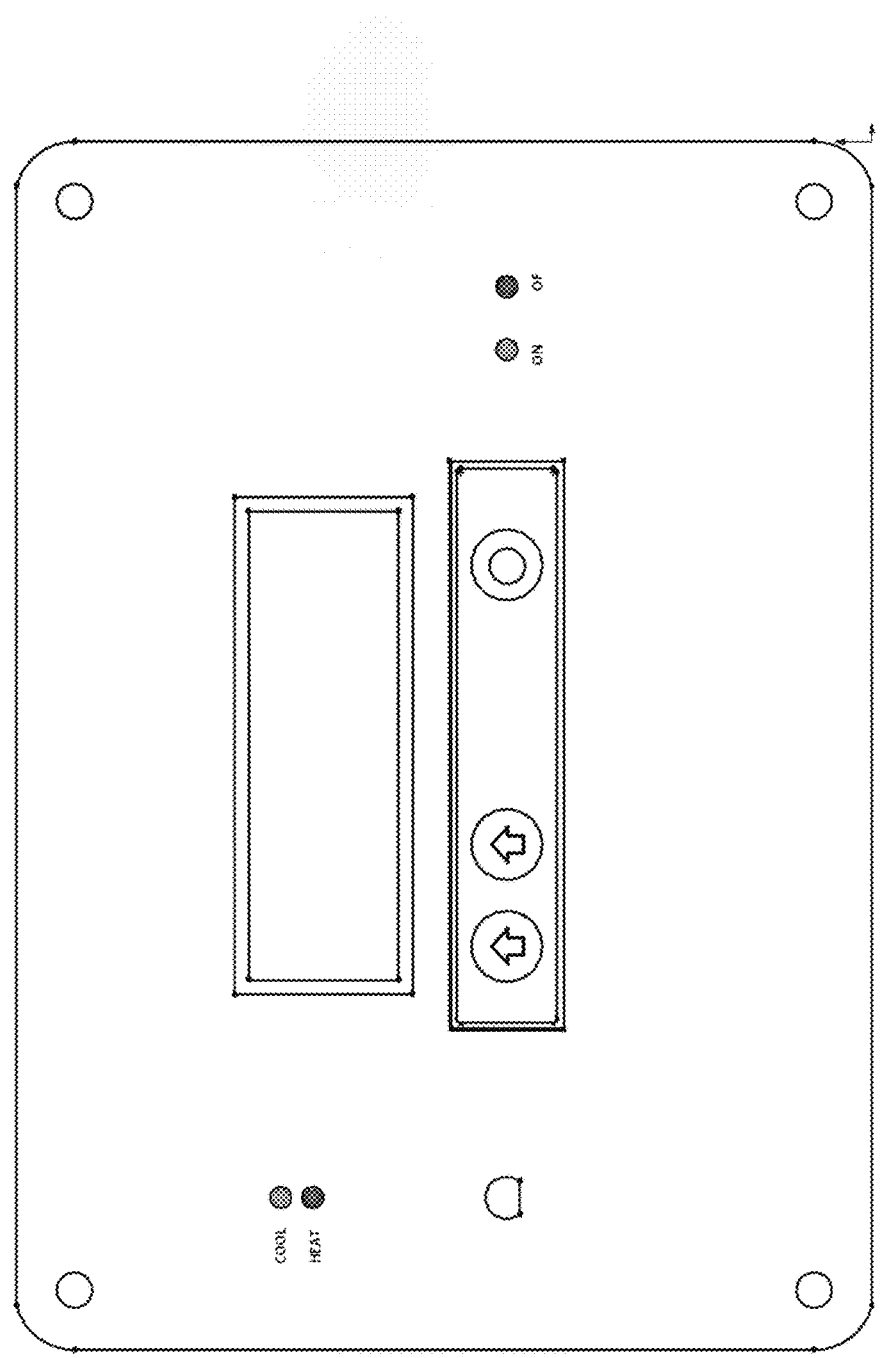
FIG. 12b displays a perspective view of the central control unit faceplate (horizontal alignment) show three status lights.
Figure 14:
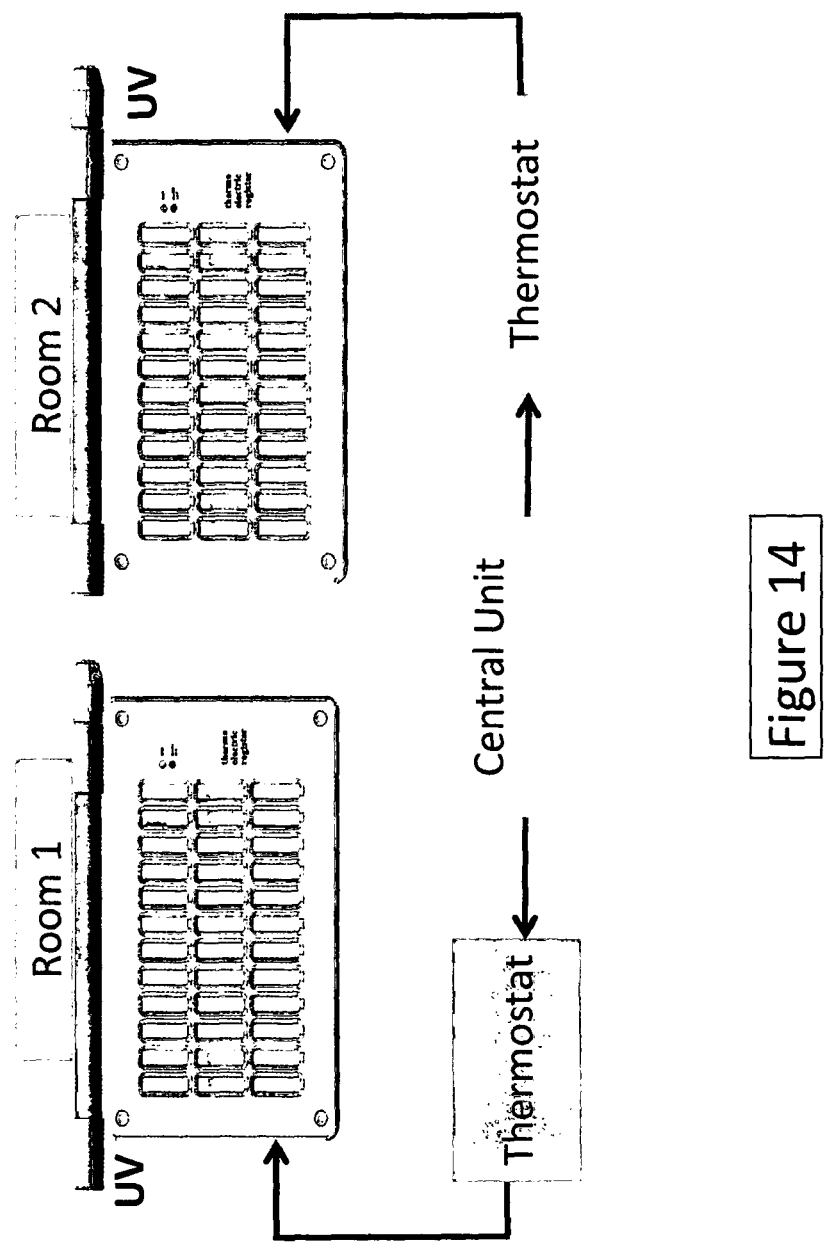
FIG. 14 is a schematic overview of the complete system.

The rotation motor is mounted behind the plurality of airflow regulation fins as can be observed in FIG. 2b. The primary purpose of the rotation motor is to provide rotational force input needed to affect motion of the plurality of airflow regulation fins. The rotation motor comprises any small scale electric motor which is capable of two direction rotation. Both directions are necessary in order to allow the plurality of airflow regulation fins to be both opened and closed. The exact specifications of the rotation motor are subject to change in the final embodiment of the present invention. The rotation motor is complemented by the actuation interface. The actuation interface is responsible for two functions. One, connecting the rotation motor to the plurality of airflow regulation fins as can be observed in FIG. 2b. And two, transferring the rotational motion produced by the rotation motor into linear back and forth motion. This is accomplished through the use of a simple threading of the actuation interface and the axle of the rotation motor. This can be observed in FIG. 2a. The actuation interface is connected to all of the plurality of airflow regulation fins which are transversely stationary but are able to rotate. When the actuation interface moves transversely relative to the plurality of regulation fins, they are caused to rotate, thereby altering the airflow out of the automated vent.

The UV sterilization lamp is mounted directly behind the plurality of airflow regulating fins. Thus, the UV sterilization lamp is positioned directly within any airflow that travels out of the automated vent. It is a well-known fact that ultraviolet light is capable of destroying or weakening many pathogens such as viruses and bacteria. Thus, the UV sterilization lamp is capable of reducing the incidence of pathogens present within an airflow that flows out of the automated vent and into a room of the building. The UV sterilization lamp is only activated if the plurality of airflow regulating fins are in the open position and are allowing air to flow out of the automated vent. This is regulated by the control circuit. The UV sterilization lamp drastically reduces the number of pathogens present in the airflow, and thus it is a very useful addition to the automated vent. The exact positioning and technical specifications of the UV sterilization lamp may be subject to modification in the final embodiment of the present invention, however the preferred embodiment can be observed in FIG. 2a.

The control circuit is responsible for controlling the degree to which the plurality of airflow regulating fins are opened and thus regulating the airflow into the room. The control circuit is also responsible for controlling whether the UV sterilization lamp is activated. Accordingly, the control circuit is electrically connected to both the UV sterilization lamp and the rotation motor. The control circuit is also linked to the thermostat from which it receives control signals pertaining to the regulation of airflow into the room. The exact positioning and technical specification of the control circuit is subject to change within the final embodiment of the present invention due to the fact that there are many ways to accomplish these control objects within the art of electrical engineering.

The final component of each automated vent is the LED indicators. The primary purpose of the LED indicator is to inform an outside observer of the current status of the automated vent. The LED indicator comprises a condition indicator LED and an alarm indicator LED. The condition indicator is intended to show whether or not the given automated vent is opened or closed. Both of the indicator LED displays blink when one of the components of the automated vent is currently inoperable. If either the rotation motor or the UV sterilization lamp is non-functional, the alarm indicator LEDs flash red, thereby informing an outside observer of the malfunction such that it can be repaired.

The thermostat enables two primary functions necessary to the operation of the present invention; one, the thermostat keeps track of the current temperature within the room. And two, the thermostat allows the user to set a desired temperature for the room. The thermostat is electrically connected to the automated vents and to the central HVAC system. The thermostat comprises a temperature sensor, a user display, and a user interface in addition to these electrical connections. The temperature sensor detects the current temperature of the room where the thermostat is installed and sends this information to the user display. The user display shows the user two pieces of vital information; one, the current temperature in the room as detected by the temperature sensor. And two, the current set desired temperature within the room. Through its electrical connections to the automated vents and the central HVAC system, the thermostat attempts to get the current room temperature as close to the desired temperature as possible. This process is independent of the other rooms in the building, thereby enabling independent temperature control of each room where a modification kit is installed. The user interface of the thermostat comprises a plurality of buttons and or knobs which enable the user to set the desired temperature level to some value. The exact design of the user interface may vary greatly in the final embodiment of the present invention.

The final component of the modification kit is the power converter. The power converter is responsible primarily for converting alternating current from the building's electrical systems into the proper voltage usable by the various components of the modification kit. The power converter is electrically connected to the thermostat, the automated vents, and to the electrical wiring present within the building from which it receives electricity. The power converter may be an independent unit with only electrical connections to the other component, or it may be physically connected or integrated into the thermostat. Thus, the modification kit is supplied with the required electricity needed to function. The exact specifications of the power converter are subject to change in the final embodiment of the present invention.

In one alternative embodiment of the present invention the thermostat incorporates wireless communications technology such that it can receive control signals wirelessly via the internet. This reception of wireless communications opens new avenues for methods of controlling the thermostat. A mobile application for use on a modern mobile device such as a tablet computer has been designed which allows the user to alter the options of the systems remotely. This may be from within the house, or possibly even from outside the house utilizing communications networks such as those created with cell towers.

Although the present invention has been explained in relation to its preferred embodiment, it is to be understood that many other possible modifications and variations can be made without departing from the spirit and scope of the invention as herein described.

What is claimed is:

1. A controllable vent comprising:
    a faceplate for fastening the vent to the wall over an outflow of an HVAC system;
    a thermostatic control circuit;
    a plurality of airflow regulating fins;
    an arm member connected to the plurality of airflow regulating fins;
    an actuation interface connected to the arm member;
    an ultraviolet lamp disposed behind the plurality of airflow regulating fins and positioned within an airflow of the vent; and
    a rotational actuator motor, connected to the control circuit, having an axle in communication with the actuation interface, wherein the actuation interface causes rotational motion of the axle to be translated into linear motion of the arm member to move the airflow regulating fins between a closed position and an open position, wherein the vent includes LED indicators configured to indicate whether the vent is in an open state or a closed state or if the rotational actuator motor or the ultraviolet lamp is malfunctioning.

2. The vent of claim 1 wherein the actuation interface further comprises:
    a. a thread connected to the rotation motor;
    b. a rack in communication with the thread; and
    c. a plurality of fingers extending from the thread, wherein each finger is pivotally connected to a fin.

3. The vent of claim 1 wherein the control circuit is adapted to detect and respond to room temperature changes, wherein it may respond by opening and closing the said airflow fins.

4. The vent of claim 1 further comprising an S-shaped grill on the faceplate.

* * * * *